(12) United States Patent
Dally

(10) Patent No.: US 11,863,118 B2
(45) Date of Patent: Jan. 2, 2024

(54) BEARING SYSTEM FOR SOLAR TRACKER

(71) Applicant: SUN AND STEEL SOLAR LLC, Stateline, NV (US)

(72) Inventor: Robert B. Dally, Stateline, NV (US)

(73) Assignee: SUN AND STEEL SOLAR LLC, Stateline, NV (US)

( * ) Notice: Subject to any disclaimer, the term of this patent is extended or adjusted under 35 U.S.C. 154(b) by 0 days.

(21) Appl. No.: 17/558,208

(22) Filed: Dec. 21, 2021

(65) Prior Publication Data

US 2022/0200520 A1     Jun. 23, 2022

Related U.S. Application Data

(60) Provisional application No. 63/129,128, filed on Dec. 22, 2020.

(51) Int. Cl.
| | |
|---|---|
| *H02S 20/32* | (2014.01) |
| *F16C 17/02* | (2006.01) |
| *F24S 30/425* | (2018.01) |
| *F16C 33/06* | (2006.01) |
| *F24S 30/00* | (2018.01) |

(52) U.S. Cl.
CPC .............. *H02S 20/32* (2014.12); *F16C 17/02* (2013.01); *F16C 33/06* (2013.01); *F24S 30/425* (2018.05); *F16C 2380/00* (2013.01); *F24S 2030/15* (2018.05)

(58) Field of Classification Search
CPC ....... H01L 31/00–078; Y02E 10/50–60; H02S 20/00–32; H02S 30/00–20
See application file for complete search history.

(56) References Cited

U.S. PATENT DOCUMENTS

| | | |
|---|---|---|
| 3,820,860 A | 6/1974 | Stone |
| 4,704,038 A | 11/1987 | Bruchon, Jr. |
| RE32,764 E | 10/1988 | Smith et al. |
| 7,354,199 B2 | 4/2008 | Welch et al. |
| 9,206,999 B2 | 12/2015 | Reed et al. |
| 9,273,721 B2 | 3/2016 | Behn et al. |
| 9,322,437 B2 | 4/2016 | Agullo |
| 9,531,320 B2 | 12/2016 | Moreno |
| 9,806,669 B2 | 10/2017 | De Welle |
| 10,298,172 B2 | 5/2019 | Oh et al. |
| 10,944,354 B2 | 3/2021 | Ballentine et al. |
| 10,972,045 B2 | 4/2021 | Cherukupalli et al. |
| 11,035,591 B2 | 6/2021 | Childress |
| 11,230,866 B2 | 1/2022 | Dally |
| 11,300,979 B2 | 4/2022 | Kesler et al. |
| 11,387,771 B2 | 7/2022 | Au et al. |
| 11,411,529 B2 | 8/2022 | Liu et al. |

(Continued)

FOREIGN PATENT DOCUMENTS

WO     2020129091 A1     6/2020

OTHER PUBLICATIONS

U.S. Office Action U.S. Appl. No. 17/558,208 dated Apr. 26, 2023.
(Continued)

*Primary Examiner* — Bach T Dinh
(74) *Attorney, Agent, or Firm* — SHERMAN IP LLP; Kenneth L. Sherman; Steven Laut

(57) ABSTRACT

One embodiment provides an apparatus for a single axis tracker that includes a first strap component formed into a first portion of a bearing race. A second strap component is formed into a second portion of the bearing race. The first portion of the bearing race and the second portion of the bearing race removably interleave to hold a torque tube.

19 Claims, 25 Drawing Sheets

(56) References Cited

U.S. PATENT DOCUMENTS

| | | |
|---|---|---|
| 2011/0253195 A1 | 10/2011 | Kim |
| 2012/0216851 A1 | 8/2012 | Jang |
| 2013/0160816 A1* | 6/2013 | Barton .................... H02S 20/10 |
| | | 136/246 |
| 2016/0218663 A1 | 7/2016 | Werner et al. |
| 2017/0234580 A1 | 8/2017 | Worden |
| 2018/0062565 A1* | 3/2018 | Schimelpfenig ........ H02S 20/32 |
| 2018/0062567 A1 | 3/2018 | Oh et al. |
| 2018/0347859 A1* | 12/2018 | Ros Ruiz ................ F24S 80/00 |
| 2019/0226520 A1 | 7/2019 | Forder et al. |
| 2020/0052643 A1 | 2/2020 | Ballentine et al. |
| 2020/0076357 A1 | 3/2020 | Cherukupalli et al. |
| 2021/0305932 A1 | 9/2021 | Liu et al. |
| 2022/0052636 A1 | 2/2022 | Au et al. |
| 2022/0077816 A1 | 3/2022 | Morin et al. |
| 2022/0103116 A1* | 3/2022 | McPheeters .......... F24S 30/425 |
| 2022/0149773 A1 | 5/2022 | Reznar et al. |
| 2022/0200520 A1 | 6/2022 | Dally |
| 2022/0278642 A1 | 9/2022 | Kumar et al. |
| 2022/0294385 A1 | 9/2022 | Guo et al. |
| 2022/0294386 A1 | 9/2022 | Creasy et al. |
| 2022/0325736 A1 | 10/2022 | De La Fuente De Pablo |
| 2022/0333642 A1 | 10/2022 | Sasidharan et al. |
| 2023/0279987 A1 | 9/2023 | Dally |

OTHER PUBLICATIONS

U.S. Final Office Action U.S. Appl. No. 17/558,208 dated Sep. 29, 2023.

* cited by examiner

BEARING SYSTEM FOR SOLAR TRACKER

CROSS-REFERENCE TO RELATED APPLICATIONS

This application claims the priority benefit of U.S. Provisional Patent Application Ser. No. 63/129,128, filed Dec. 22, 2020, which is incorporated herein by reference in its entirety.

BACKGROUND

Field

One or more embodiments are directed to a bearing race portion of a simple bearing system (simple journal turning inside a simple bearing race) formed from a single piece of flat stock metal that forms half of an attachable bearing race of which two halves interleave to form one full bearing race that readily attaches to a pier or post with both vertical and lateral positioning adjustment, a plurality of these bearings on a plurality of piers or posts align to allow the journaling of a torque tube of a single-axis solar tracker with solar modules attached.

Description of the Related Art

Single-axis trackers are mounting structures used for the controlled movement of photovoltaic solar panels from east to west to track the sun daily.

All single-axis trackers place the solar collectors on top of the moving mechanical structure such that the moving mechanical structure will not shade the photovoltaic (PV) solar modules. Single-axis trackers that utilize an elevated center torque tube as an axle require a bearing system at the top of the posts or piers. Generally, the PV solar modules are moved from a 45° tilt eastward to a 45° tilt westward. Slightly higher tilts (e.g., 50°, 55°, 60° maximum) are achievable. The daily back and forth tilts require a bearing system, either elaborate (e.g., ball or roller bearings of exotic metals) or simple (e.g., a round, steel torque tube slowly rubbing against a round, steel bearing race), and designed to aid in field assembly and maintenance of the single axis tracker system.

SUMMARY OF THE INVENTION

To aid in the understanding of the embodiments, it can be stated in essentially summary form that the one or more embodiments provide a specialized bearing half-race that attaches to a support post or pier in tandem with a second identical half-bearing race and forms a full bearing race for a simple bearing for torque tubes on a single-axis tracker.

One embodiment provides an apparatus for a single axis tracker that includes a first strap component formed into a first portion of a bearing race. A second strap component is formed into a second portion of the bearing race. The first portion of the bearing race and the second portion of the bearing race removably interleave to hold a torque tube.

These and other features, aspects, and advantages of the embodiments will become understood with reference to the following description, appended claims, and accompanying figures.

DETAILED DESCRIPTION

Figure 1:
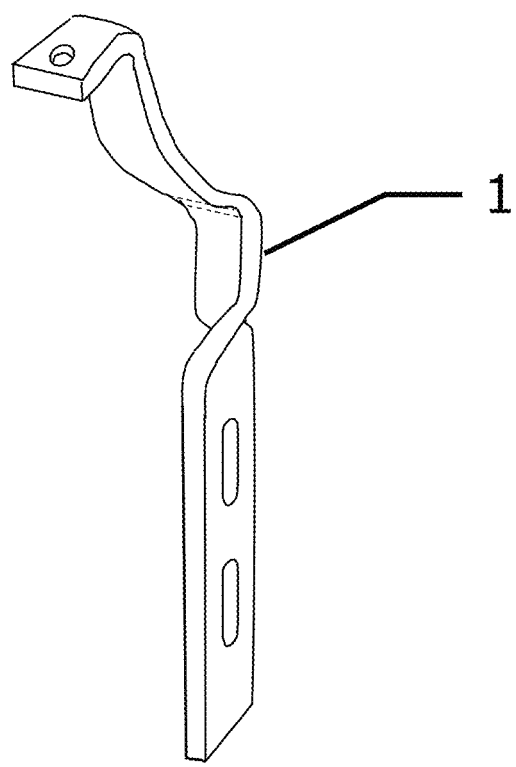
FIG. 1 shows a perspective view of a first lower portion of a bearing race component for a solar tracker system, according to one embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one or more embodiments, a specialized bearing half-race that attaches to a support post or pier in tandem with a second identical half-bearing race and forms a full bearing race for a simple bearing for torque tubes on a single-axis tracker. In some embodiments, metal straps are formed to create an attachable half of a bearing race. In one or more embodiments, two identical halves of a lower bearing component are coupled or interleaved with each other to create a full bearing race that holds a rotating torque tube as a journal.

One embodiment provides an apparatus for a single axis tracker that includes a first strap component formed into a first portion of a bearing race. A second strap component is formed into a second portion of the bearing race. The first portion of the bearing race and the second portion of the bearing race removably interleave to hold a torque tube.

The first basic concept of a bearing for a large single-axis tracker row is to maintain alignment of the torque tube axle while allowing the torque tube to rotate, journaling the solar panels between an east west tilt orientations. One significant advantage of one or more embodiments is that the bearing race is made from a single flat piece of metal, such as steel, with no welding required, but only cutting and cold forming. Two identical items of the bearing half-race unique interleave such that the two identical halves form a full bearing race for containing the journal section of the torque tube. Another advantage of the one or more embodiments is that the bearing halves pivot, or scissor, to allow the torque tube system to drop into the bearing race from above, facilitating field assembly of the torque tube system.

There are several innovations for one or more embodiments, which include various methods to attach bearing halves to support posts or piers. The lower portion of a bearing may have vertical slots for attaching to a flat surface web of the support post (or pier), such as an I-Beam, using fasteners (e.g., bolts, washers and nut hardware, etc.) and for providing vertical adjustment of the bearing relative to the post or pier. The posts or piers may have slots (or openings) such that the formed bearing may be adjusted (e.g., laterally, vertically, etc.). A lower cost embodiment forgoes mounting slots in both the posts or piers and the bearing race-halves, and relies on field welding of the bearing race-halves to the piers or posts.

Figure 8A:
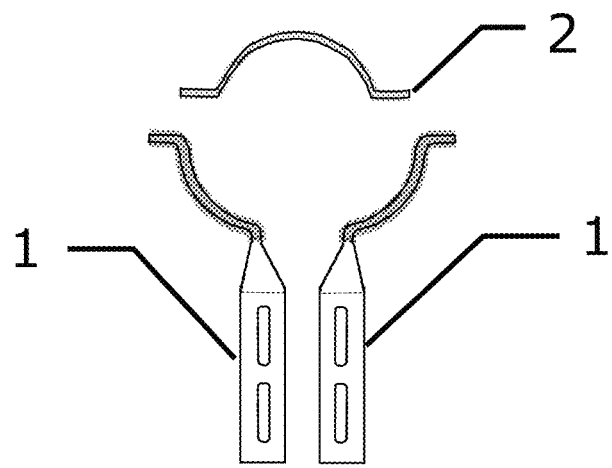
FIG. 8A shows an exploded view of a bearing race system comprised of first and second lower portions of the bearing race component of FIG. 1 and a bearing race cap, according to one embodiment.
Figure 8B:
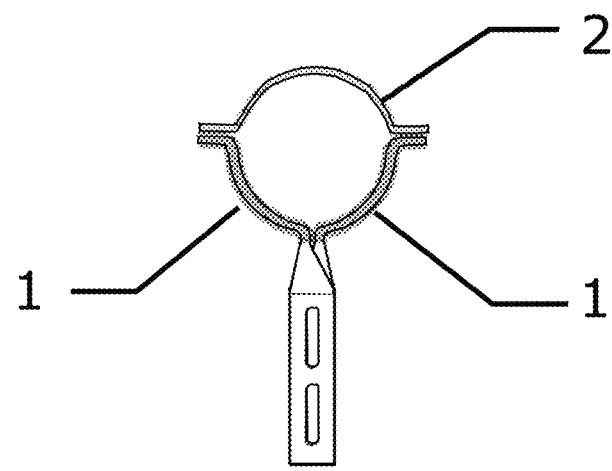
FIG. 8B shows a view of a formed bearing race system comprised of first and second lower portions of the bearing race component of FIG. 1 and the bearing race cap, according to one embodiment.

FIG. 1 shows a perspective view of a first lower portion 1 of a bearing race component for a solar tracker system, according to one embodiment. In some embodiments, the lower part of the first lower portion 1 includes multiple (e.g., two, three, four, etc.) slots (e.g., vertical openings, through-holes, etc.) for attaching to a flat side of a pier 3 (FIG. 9), such as a web of an I-beam. The middle portion of the first lower portion 1 is twisted about ninety (90) degrees and forms a transition neck. In one embodiment, the upper portion is rolled into a partial (e.g., a quarter, etc.) circular race ending with an upper tab folded about ninety (90) degrees outward and including a through-hole or opening (having a circular, polygonal, etc., shape) for attaching a top bearing race or bearing top cap 2 (FIGS. 8A-B).

In one embodiment, the first lower portion 1 may be formed from a metal strap having a significant thickness and width to perform as half of the bottom component of an attachable simple bearing race for a journaling single axis solar tracker, which is interleaved or congruent with a second identical formed metal strap to create the bottom half of a bearing race. The form of the first lower portion 1 includes a lower section for attachment to the flat surface of a support pier 3 (FIG. 9), either by field welding, with fastening hardware (e.g., bolt and nut, screws, etc.), etc., in one or more openings (e.g., holes, slots, etc.). Positioned above the openings is an off-center twist (e.g., about ninety (90) degrees) followed by about a ninety (90) degree bend outwards to form a semi-circular half-race with an inside radius just slightly larger than the outside radius of the torque tube journal (e.g., round torque tube, round journal, round journal-coupler, etc.) that rotates within to form half of the bottom half of a bearing race, or a bottom quarter of the full bearing race, followed by a ninety (90) degree bend outward to form an upper tab for securing the bearing top cap 2 (FIGS. 8A-B) half-race.

Figure 2:
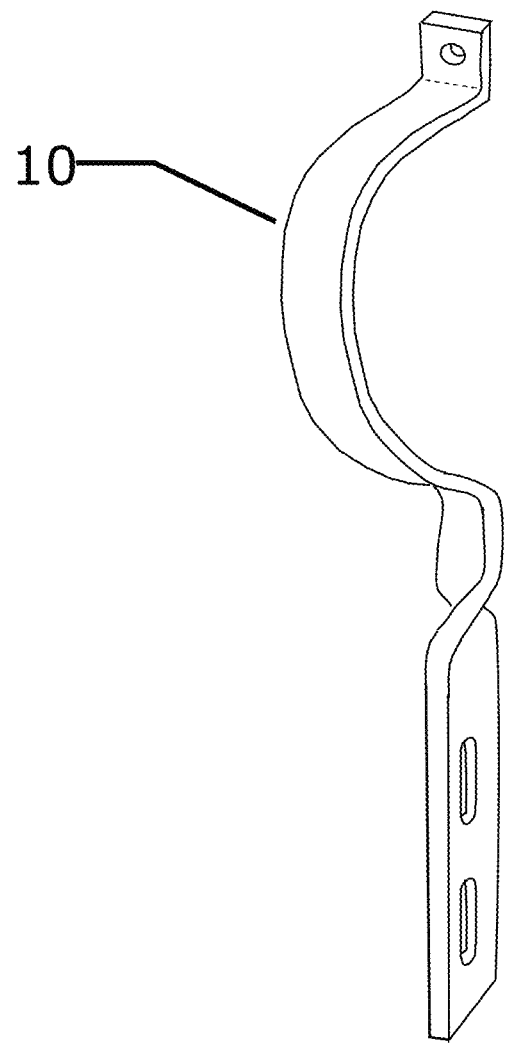
FIG. 2 shows a perspective view of another first lower portion of another bearing race component for a solar tracker system, according to one embodiment.

FIG. 2 shows a perspective view of another first portion 10 of another bearing race component for a solar tracker system, according to one embodiment. The first portion 10 may be formed from a similar metal strap as the first portion 1 (FIG. 1). The bottom and middle portions of the first portion 10 are the same as the first portion 1 (FIG. 1). The top portion is rolled into a semi-circular race ending with an upper tab folded about ninety (90) degrees upward and including a through-hole or opening (having a circular, polygonal, etc., shape) for attaching to a second portion 10 (see FIG. 16).

Figure 3:
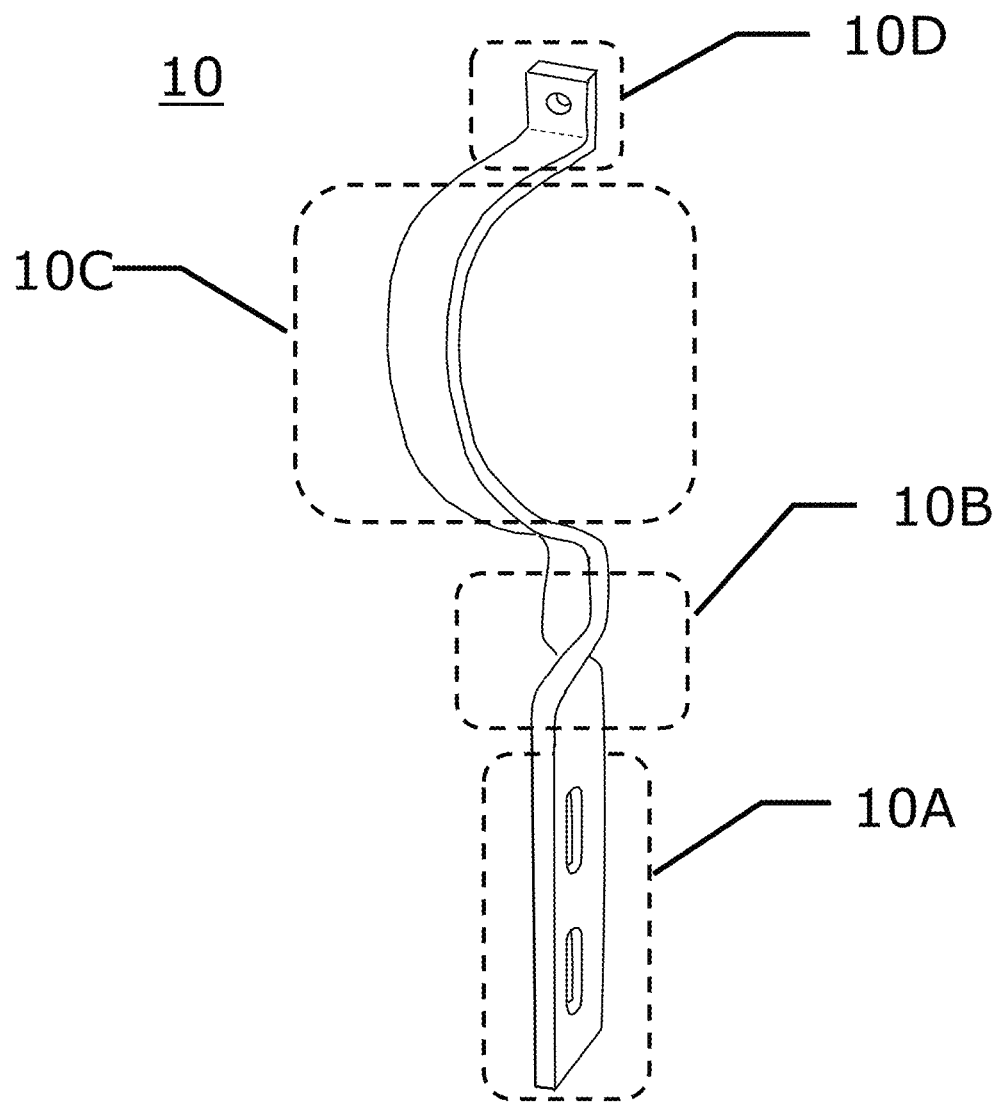
FIG. 3 shows multiple (manufacturing) forming zones on the first lower portion of the bearing race component of FIG. 2, according to one embodiment.

FIG. 3 shows multiple (manufacturing) forming zones (10A-D) on the first portion 10 of the bearing race component of FIG. 2, according to one embodiment. In one embodiment, the forming zone 10A pertains to the attachment slots. The forming zone 10B pertains to the off-center twist of about ninety (90) degrees. The forming zone 10C pertains to the semi-circular race. The forming zone 10D pertains to the adjoining upper tab. In one embodiment, the forming of the zones 10A-D may be made manually, by metal bending machinery, robotics, etc.

Figure 4:
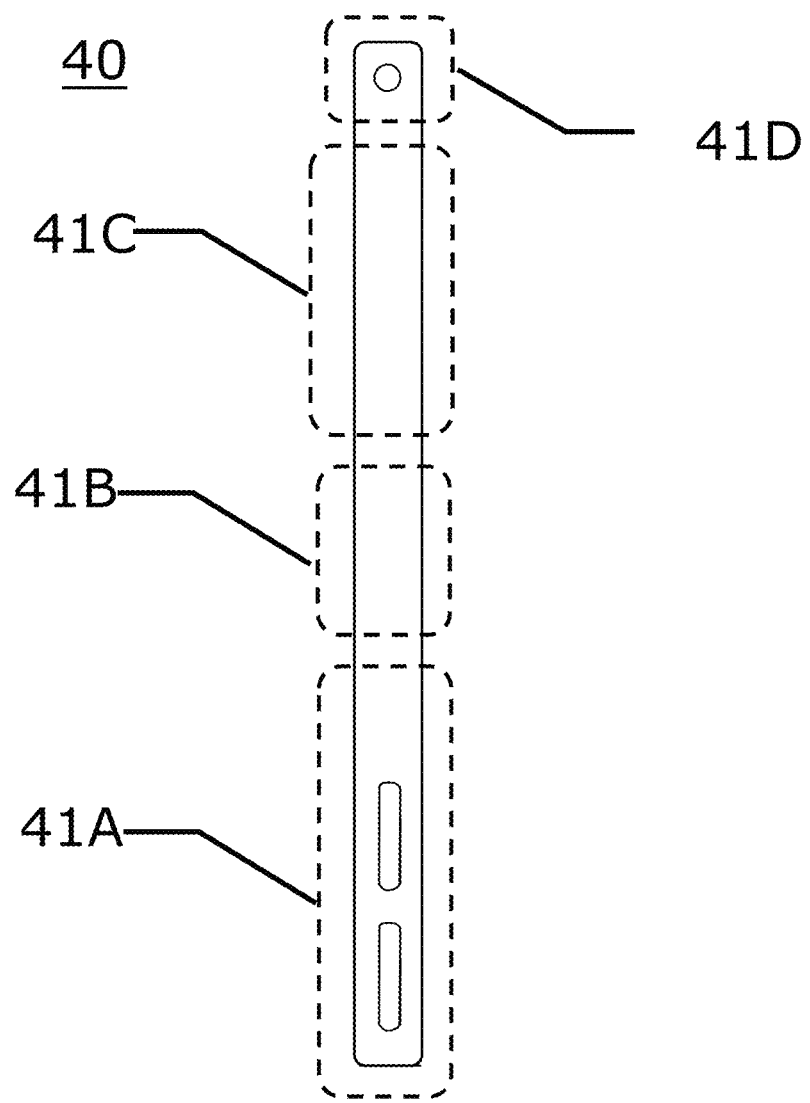
FIG. 4 shows the multiple (manufacturing) forming zones on a flat metal strap before forming into the first lower portion of the different bearing race components shown in FIGS. 1 and 2, according to some embodiments.

FIG. 4 shows the multiple (manufacturing) forming zones (41A-D) on a flat metal strap 40 before forming into the first lower portions 1 or 10 of the different bearing race components shown in FIGS. 1 and 2, according to some embodiments. In some embodiments, the forming zone 41A pertains to the attachment slots for either the first lower portions 1 or 10. The forming zone 41B pertains to the off-center twist of about ninety (90) degrees for either the first lower portions 1 or 10. The forming zone 41C pertains to the race portion for either the first lower portions 1 or 10. The forming zone 41D pertains to the adjoining upper tab for either the first lower portions 1 or 10. In one embodiment, the forming of the zones 41A-D may be made manually, by metal bending machinery, robotics, etc. In one embodiment, the flat metal strap 40 may be made of a metal, metal alloy, etc., that may be rust inhibitive, coated or bonded with rust preventive coating or material.

Figure 5:
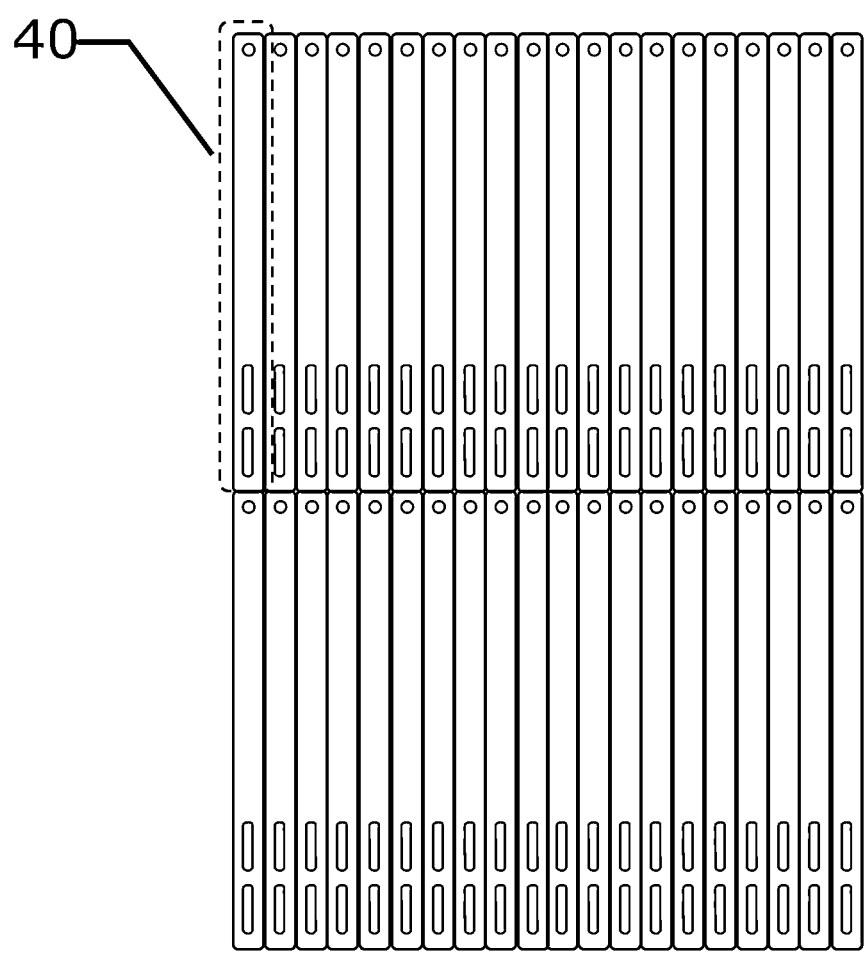
FIG. 5 shows multiple metal straps patterned on a single sheet of metal or metal alloy before cutting out the patterns into multiple single straps as shown in FIG. 4, according to some embodiment.

FIG. 5 shows multiple metal straps 40 patterned on a single sheet of metal before cutting out the patterns into multiple single straps 40 as shown in FIG. 4, according to some embodiment. In one embodiment, the single sheet may be made of metal, metal alloy, etc. In some embodiments, the single sheet may be cut using precision laser or cutting machinery, tools, etc.

Figure 6:
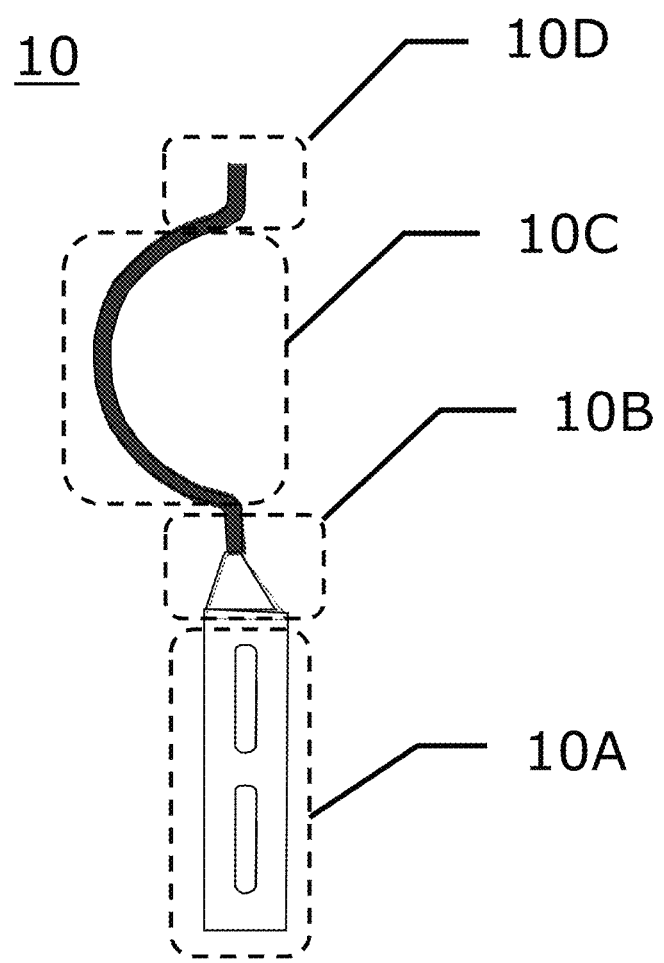
FIG. 6 shows a side view of the multiple (manufacturing) forming zones on the first lower portion of the bearing race component of FIG. 2, according to one embodiment.

FIG. 6 shows a side view of the multiple (manufacturing) forming zones 10A-D on the first portion 10 of the bearing race component of FIG. 2, according to one embodiment. As shown, the forming zone 10A includes the forming of the attachment slots for either first or second lower portion 10. The forming zones 10B-D includes the bending or twisting of a single strap 40 (FIG. 5) for either first or second lower portion 10.

Figure 7:
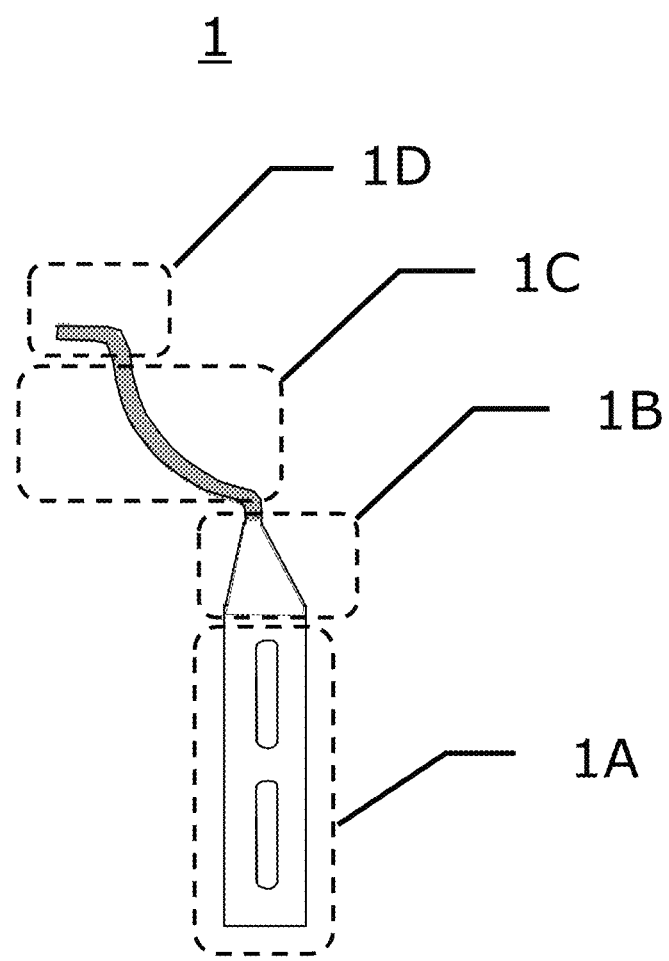
FIG. 7 shows a side view of the multiple (manufacturing) forming zones on the first lower portion of the bearing race component of FIG. 1, according to one embodiment.

FIG. 7 shows a side view of the multiple (manufacturing) forming zones 1A-D on the first lower portion of the bearing race component of FIG. 1, according to one embodiment. As shown, the forming zone 1A includes the forming of the attachment slots for either first or second lower portion 1. The forming zones 1B-D includes the bending or twisting of a single strap 40 (FIG. 5) for either first or second lower portion 1.

FIG. 8A shows an exploded view of a bearing race system comprised of the first and second lower portions 1 of the bearing race component of FIG. 1 and a bearing race cap 2, according to one embodiment. In one embodiment, the bearing race cap 2 may be made of a metal, metal alloy, etc., that may be rust inhibitive, coated or bonded with rust preventive coating or material.

FIG. 8B shows a view of a formed bearing race system comprised of the first and second lower portions 1 of the bearing race component of FIG. 1 and the bearing race cap 2, according to one embodiment. As shown, the bearing race cap 2 attaches to the first and second lower portions 1 that are connected or interleaved together before fastened as described below.

Figure 9:
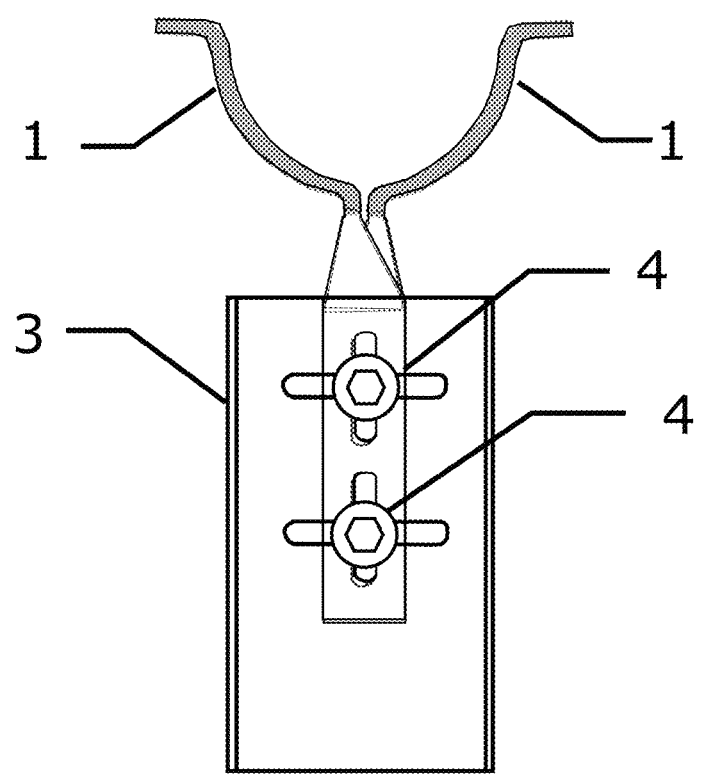
FIG. 9 shows two interleaved first and second lower portions of the bearing race component of FIG. 1 attached to a post (or pier) via hardware at a crossing of vertical and horizontal slots, according to one or more embodiments.

FIG. 9 shows two interleaved first and second lower portions 1 of the bearing race component of FIG. 1 attached to a post (or pier) 3 via hardware 4 at a crossing of vertical and horizontal slots, according to one or more embodiments. As shown, the combined first and second lower portions 1 result in alignment of the slots (e.g., vertical slots, openings, etc.) of each of the first and second lower portions 1. Connecting the post (or pier) 3 with the combined first and second lower portions 1 results in alignment of the post (or pier) 3 horizontal openings (through-holes, etc.) with the aligned slots of the first and second lower portions 1, such that the hardware 4 fasteners (e.g., bolts and nuts, etc.) may be inserted into the combined union of the fastening horizontal and vertical slots for coupling. In one embodiment, the post (or pier) 3 may be an I-beam post (or pier), or similar structure for support of torque tubes for a solar tracking system that supports multiple solar panels.

Figure 10:
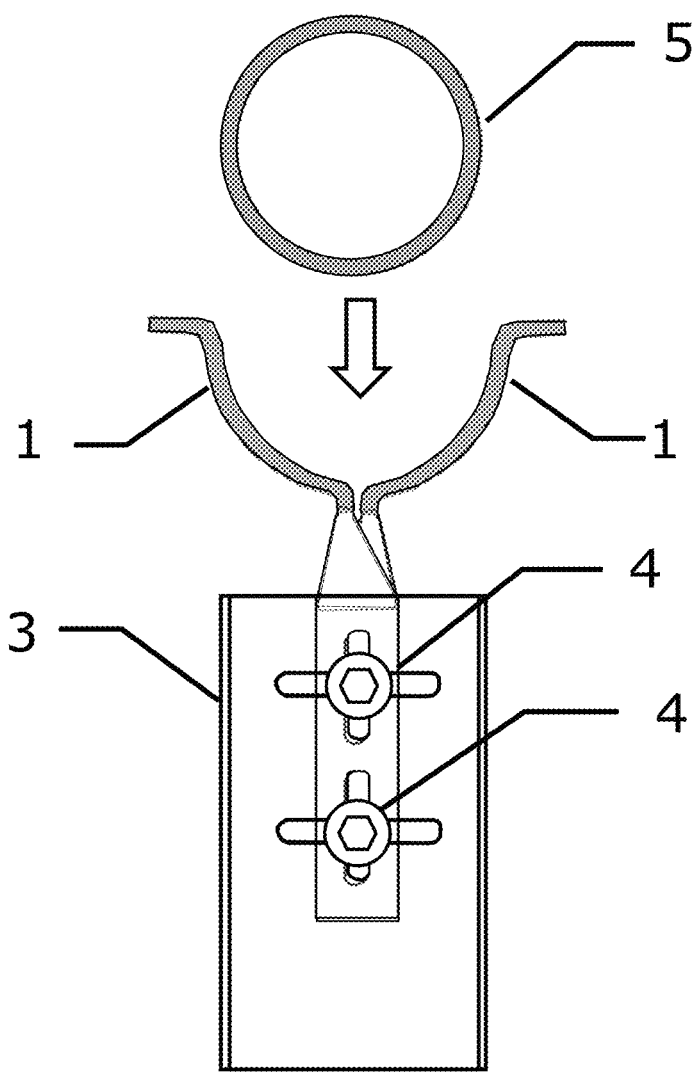
FIG. 10 shows the assembly of FIG. 9 with a torque tube (journal) component being placed into the formed lower bearing race component in the direction of the arrow, according to one embodiment.

FIG. 10 shows the assembly of FIG. 9 with a torque tube 5 (journal) component being placed into the formed lower bearing race component (from first and second lower portions 1) in the direction of the arrow, according to one embodiment. As shown, the combined first and second lower portions 1 form a concave-up cradle of the bottom bearing race system.

Figure 11:
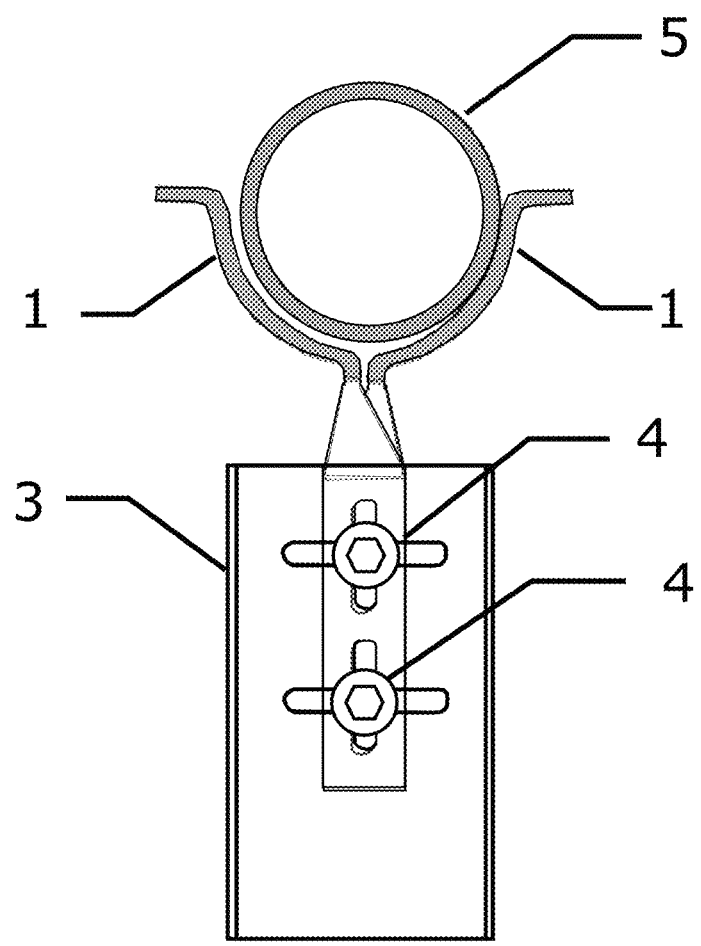
FIG. 11 shows the torque tube (journal) component placed into the formed lower bearing race component, according to one or more embodiments.

FIG. 11 shows the torque tube 5 (journal) component placed into the formed lower bearing race component (from first and second lower portions 1), according to one or more embodiments. The torque tube 5 (journal) when placed onto the formed lower race component rests in the formed cradle without additional components, elements or materials between the torque tube 5 (journal) and the formed lower race component.

Figure 12:
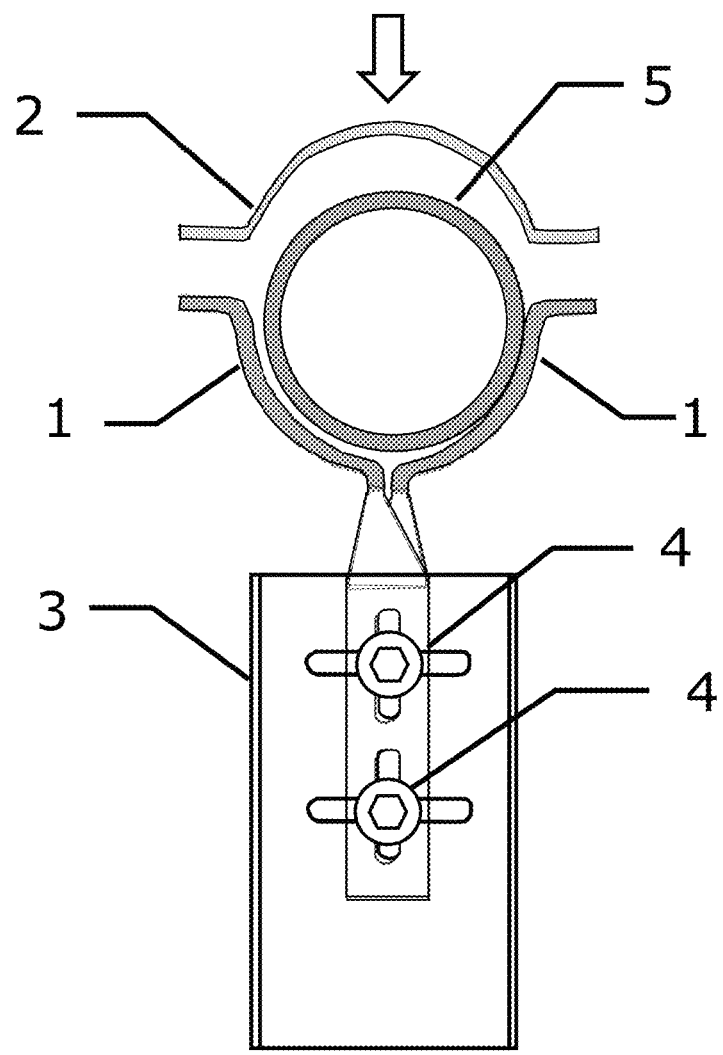
FIG. 12 shows the bearing race cap being lowered onto the formed lower bearing race in the direction of the arrow in order to complete a full race with the bearing race cap for retaining a torque tube system in alignment, according to one or more embodiments.

FIG. 12 shows the bearing race cap 2 being lowered onto the formed lower bearing race (from FIG. 11) in the direction of the arrow in order to complete a full race with the bearing race cap 2 for retaining a torque tube 5 system (e.g., multiple torque tubes serially coupled to one another) in alignment, according to one or more embodiments. In one embodiment, the bearing race cap 2 is lowered over the torque tube 5 (journal) such that the upper tabs of the lower bearing race align with attaching tabs of the bearing race cap 2 (see, e.g., FIG. 13).

Figure 13:
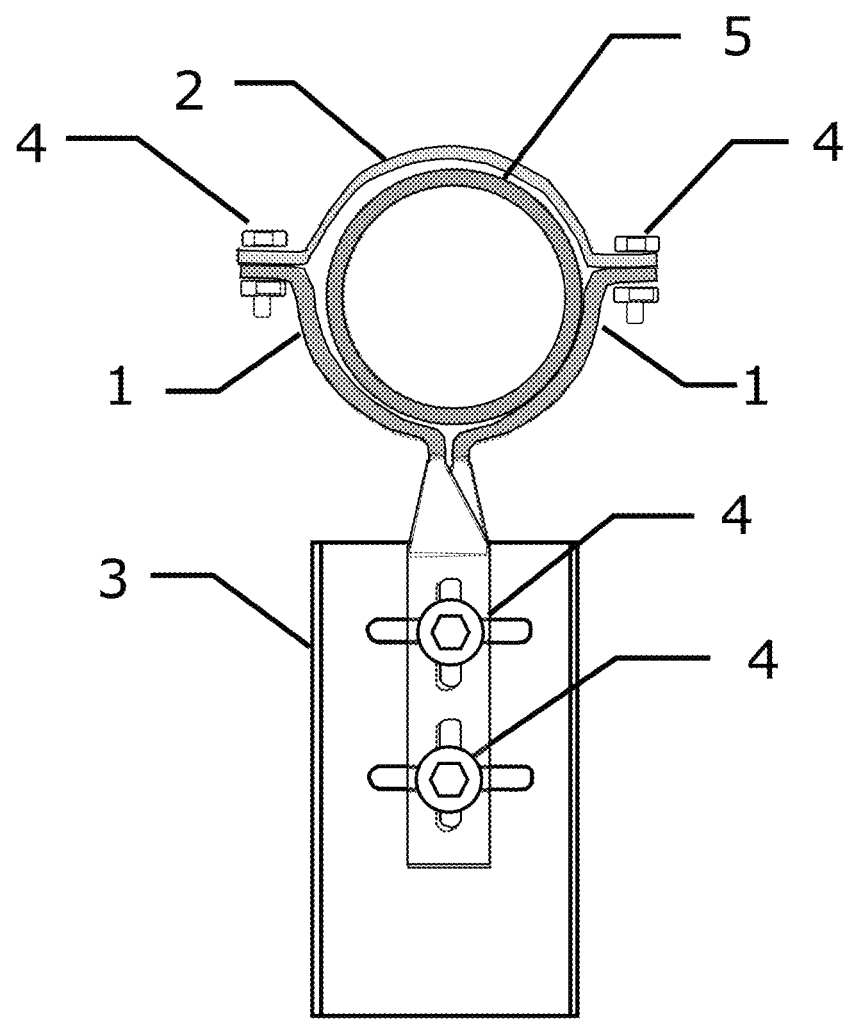
FIG. 13 shows the formed complete bearing race continuing from FIG. 12 after fastening, according to one or more embodiments.

FIG. 13 shows the formed complete bearing race continuing from FIG. 12 after fastening, according to one or more embodiments. As shown, once the bearing race cap 2 is lowered such that the upper tabs of the lower bearing race align with attaching tabs of the bearing race cap 2 for retaining the torque tube system in alignment, which is especially needed during wind uplift of solar panels connected to the torque tubes 5, according to one or more embodiments. In one embodiment, the bearing race cap 2 is fastened to the formed lower bearing race using hardware 4 fasteners.

Figure 14:
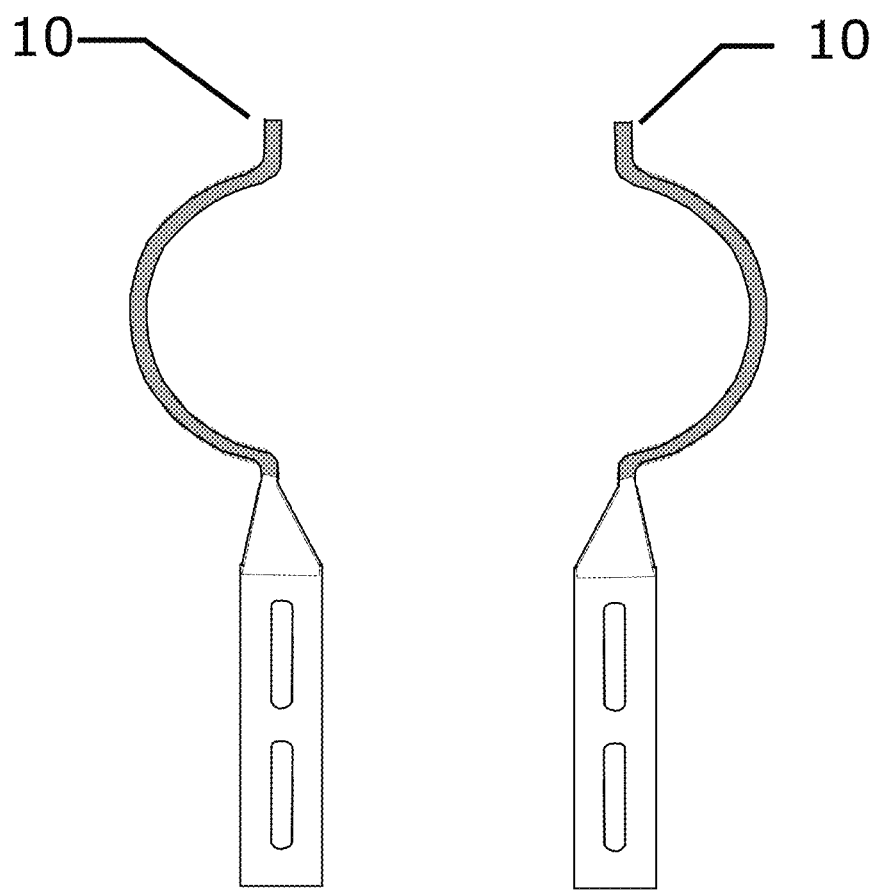
FIG. 14 shows a first lower portion and a second lower portion of a bearing race component for a solar tracker system facing each other, according to one or more embodiments.

FIG. 14 shows a first portion 10 and a second portion 10 of a bearing race component for a solar tracker system facing each other, according to one or more embodiments. In one embodiment, the first and second lower portions 10 are placed together or intertwined to form one full bearing race.

Figure 15:
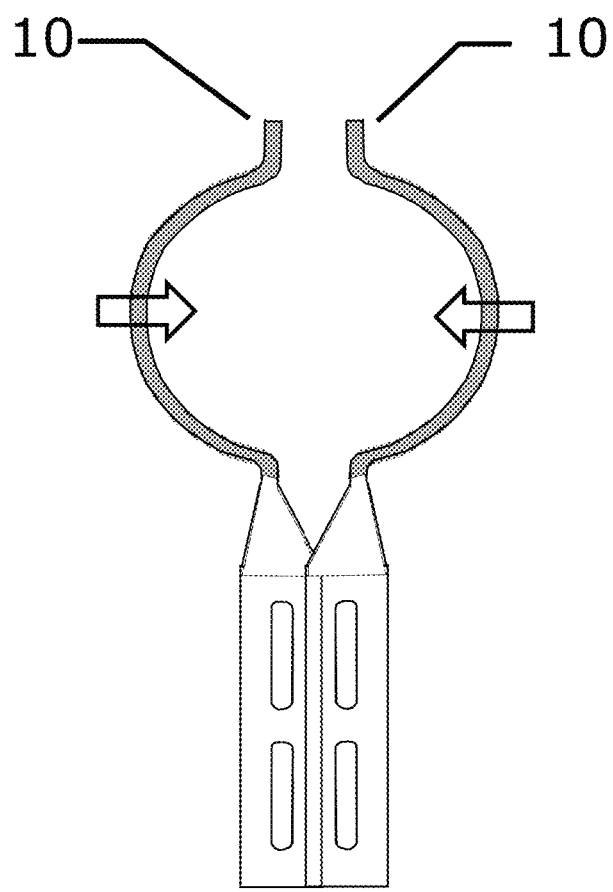
FIG. 15 shows the first lower portion and the second lower portion of a bearing race component moving in the direction of the arrow to form a lower portion of the bearing race component, according to one or more embodiments.

FIG. 15 shows the first portion 10 and the second portion 10 of a bearing race component moving in the direction of the arrow to form a lower portion of the bearing race component, according to one or more embodiments.

Figure 16:
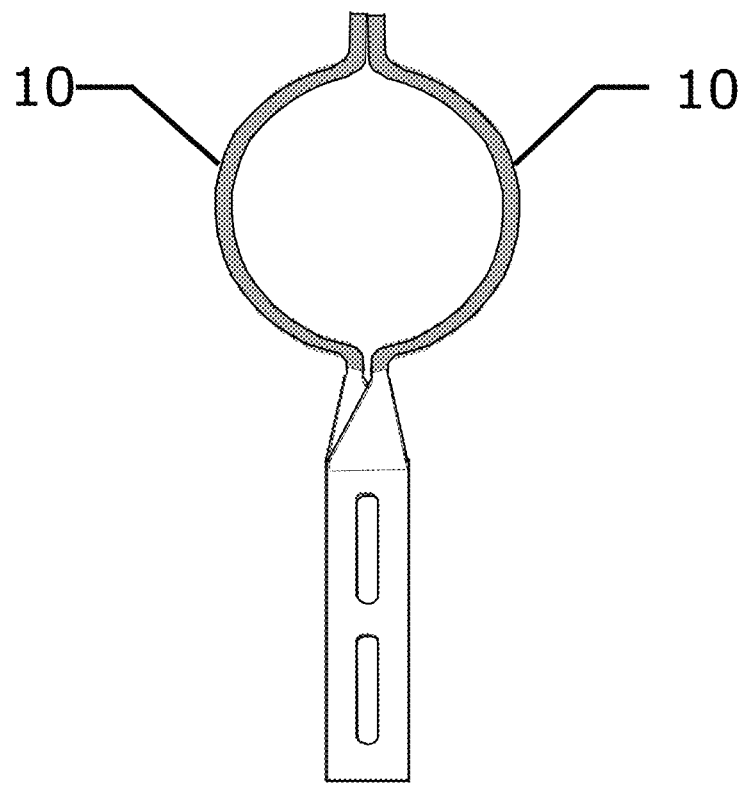
FIG. 16 shows the formed lower portion continuing from FIG. 15 for the bearing race component, according to one or more embodiments.

FIG. 16 shows the formed lower portion continuing from FIG. 15 for the bearing race component, according to one or more embodiments. As shown, the first portion 10 and the second portion 10 are placed together or intertwined about the forming zone 10B (FIG. 3) that provides for the first portion 10 and the second portion 10 to be congruently placed together.

Figure 17:
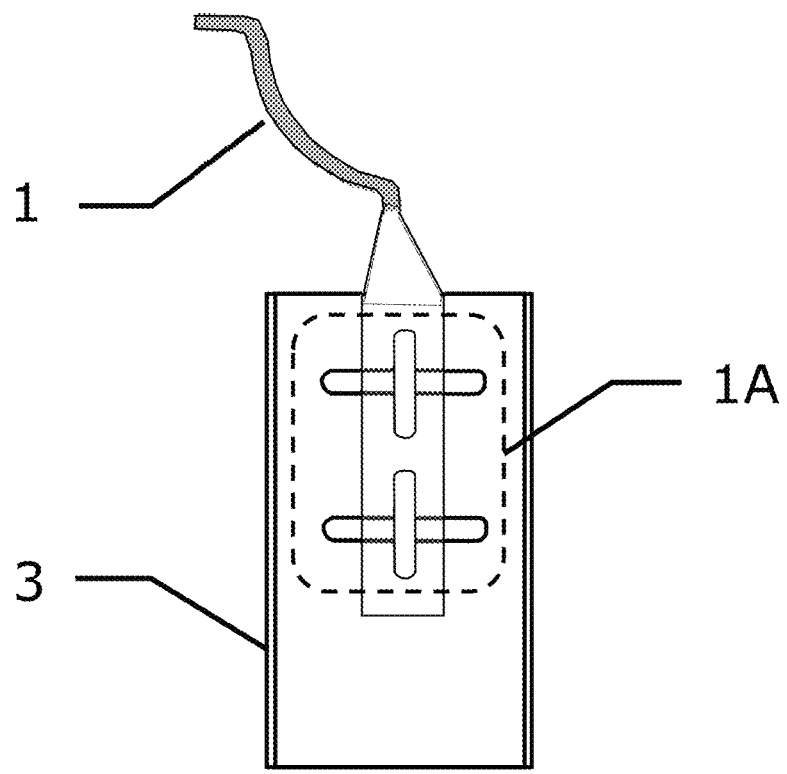
FIG. 17 shows the first lower portion of a bearing race of FIG. 1 coupled to a post (or pier), according to one or more embodiments.

FIG. 17 shows the first lower portion 1 of a bearing race of FIG. 1 coupled to a post 3 (or pier), according to one or more embodiments. As shown, the first lower portion 1 is superimposed with an I-Beam 3 to highlight the vertical and horizontal adjustability due to the crisscrossing of the vertical and horizontal slots. As shown, the first lower portion 1 is aligned such that the slots (e.g., vertical slots, openings, etc.) of the first lower portion 1 aligns with the post (or pier) 3 horizontal openings (through-holes, etc.).

Figure 18:
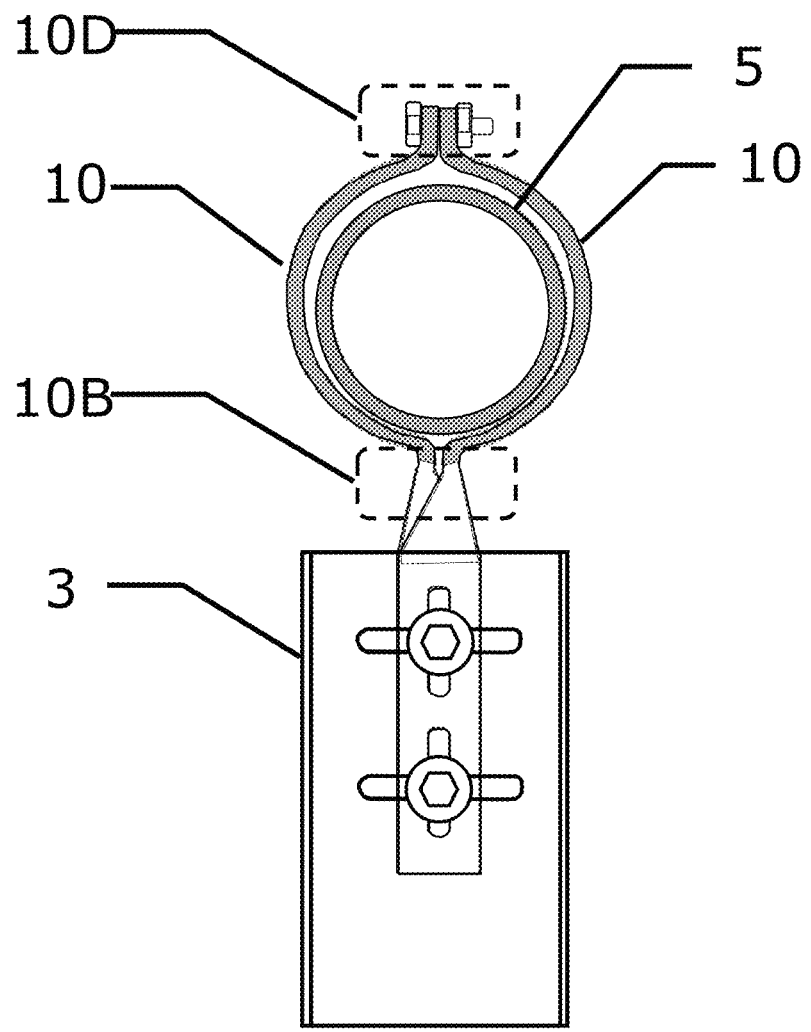
FIG. 18 shows the formed complete bearing race formed with the lower portion of FIG. 16 that is fastened and coupled with a post (or pier), according to one or more embodiments.

FIG. 18 shows the formed complete bearing race formed with the lower portion of FIG. 16 that is fastened and coupled with a post 3 (or pier), according to one or more embodiments. As shown, the complete bearing race is assembled using the first and second portions 10 with a torque tube 5 (journal) placed within the completed bearing race and the lower portion having the openings aligned with those of the post 3 (or pier) and fastened at the lower aligned openings and at the upper tabs. FIG. 18 also shows the critical twisting formation at the forming zone 10B to attain alignment of the two openings in the two connection tabs at forming zone 10D. The hardware fasteners (e.g., bolts and nuts, etc.) may be inserted into the combined union of the fastening horizontal and vertical slots for coupling.

Figure 19:
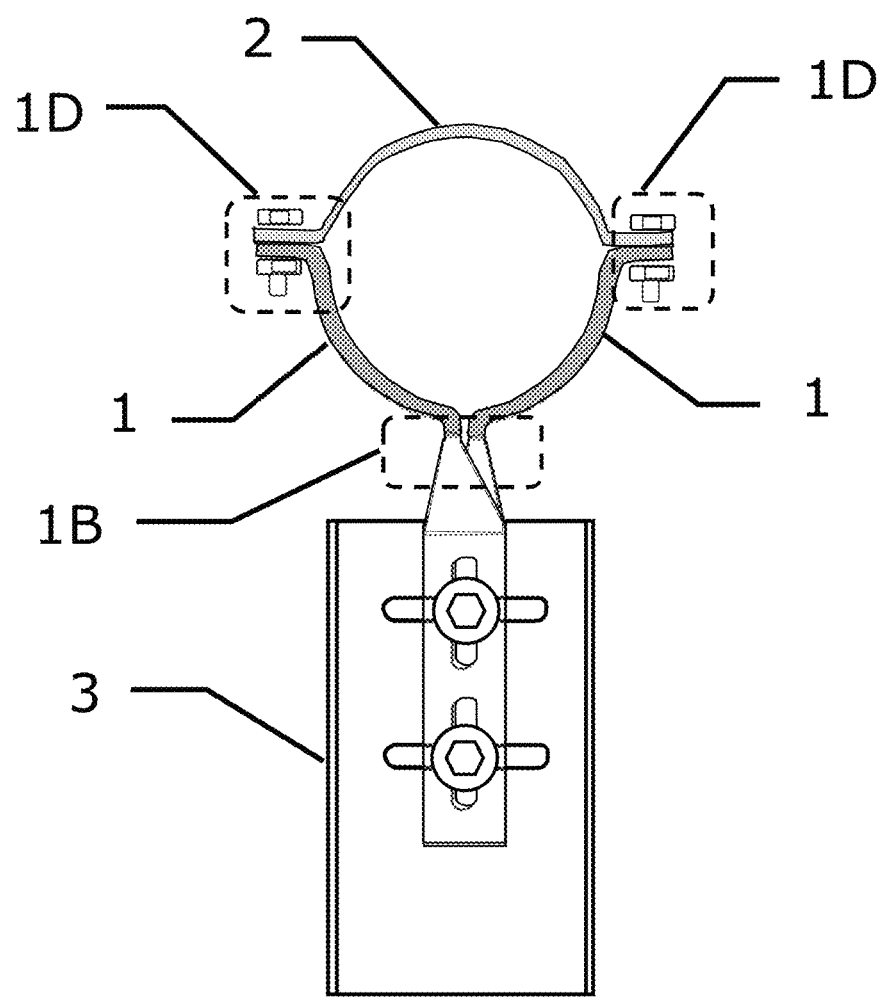
FIG. 19 shows details of the FIG. 13 without the torque tube (journal), according to one or more embodiments.

FIG. 19 shows details of the FIG. 13 without the torque tube 5 (journal), according to one or more embodiments. As shown, the first and second lower portions 1 form the bottom half of the bearing race and highlights the ability of the bearing race cap 2 that may compensate for misalignment of the tabs at the forming zone 1D due to an imperfect or off-center twist in the forming zone 1B.

Figure 20:
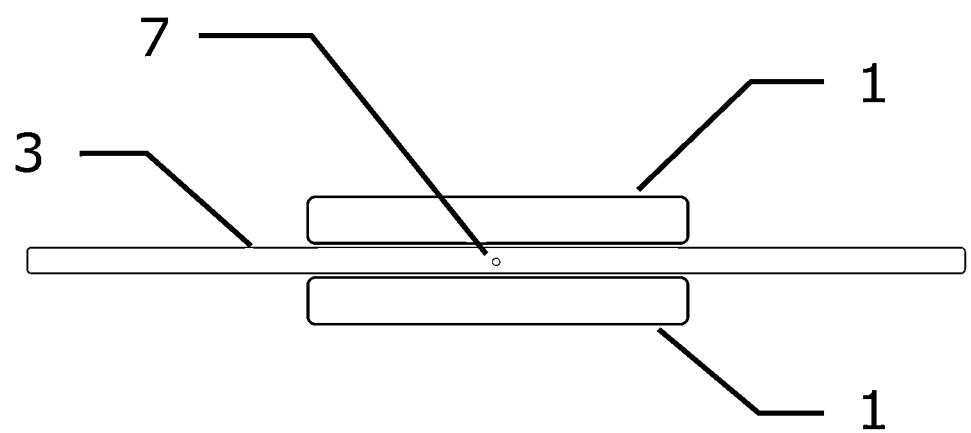
FIG. 20 shows a plan view of a first and second lower portions of a bearing race, according to one or more embodiments.

FIG. 20 shows a plan view of a first and second lower portions 1 of a bearing race, according to one or more embodiments. As shown, the post 3 (or pier) and the lower openings of the first and second lower portions 1 are positioned on either side of the post 3 (or pier). The center location 7 of the first and second lower portions 1 are shown as being offset from the center of the first and second lower portions 1.

Figure 21A:
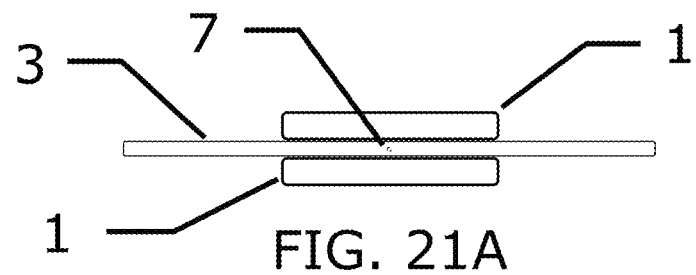
FIGS. 21A-C show the first and second lower portions of a bearing race of FIG. 20 as moved together to interleave congruently to form a bearing race as shown in FIGS. 18 and 19, according to one or more embodiments.
Figure 21B:
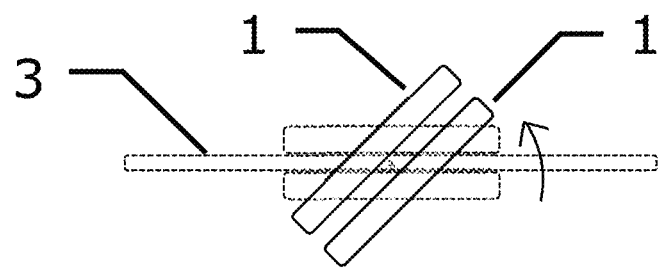
Figure 21C:
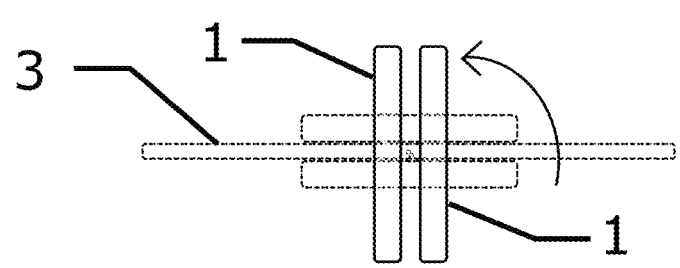

FIGS. 21A-C show the first and second lower portions 1 of a bearing race of FIG. 20 as moved (or rotated) together to interleave congruently to form a bearing race as shown in FIGS. 18 and 19, according to one or more embodiments. FIG. 21A shows the view of FIG. 20. For ease of showing the transitions. FIG. 21B shows a higher level of the view in FIG. 21A where the ninety (90) degree twist (see, e.g., forming zone 1B of FIG. 7) of the first and second lower portions 1 are commencing to be interleaved or connected congruently. FIG. 21C shows the next transition where the interleaving or congruent connection is completed. In one embodiment, the twists or forming zones 1B of the first and second lower portions 1 pair are each slightly offset from each other, and are symmetrically interleaved without interference to each other (as a result of the offset twisting, such as a rotation about the center point 7).

Figure 22:
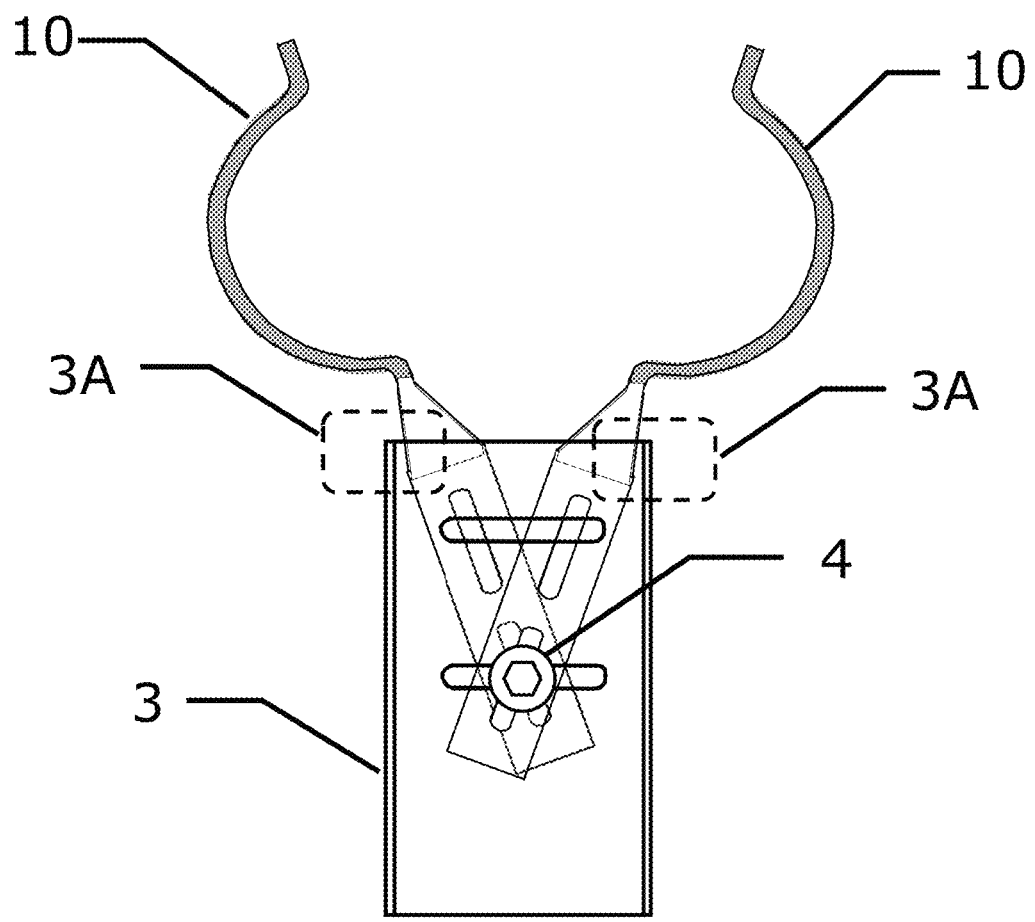
FIG. 22 shows the bearing race of FIG. 18 with a rotation scissor feature for accommodating/removal of a torque tube (journal), according to one or more embodiments.

FIG. 22 shows the bearing race of FIG. 18 with a rotation scissor feature for accommodating/removal of a torque tube 5 (journal), according to one or more embodiments. As shown, in one embodiment an upper hardware 4 fasteners set is removed and the lower hardware 4 set remains attached but loose enough to provide for the first and second portions 10 to pivot or rotate open and then coming to rest against the shoulders 3A of flanges of the post 3 (or pier), which provides for ease of closing the first and second portions 10 to close against one another to form the bearing race. This aspect provides for ease of field assembly and disassembly with the torque tubes 5 of a solar tracking system.

Figure 23:
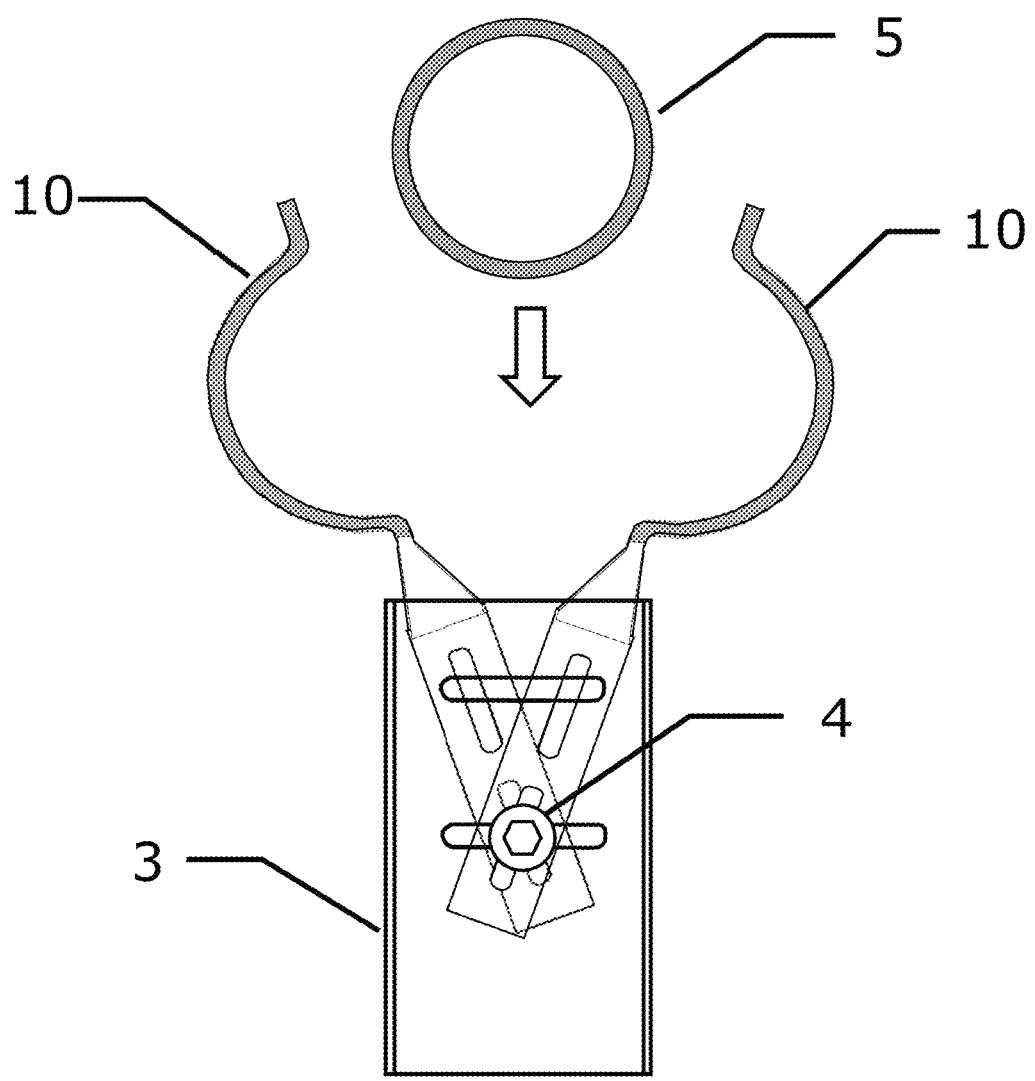
FIG. 23 shows the bearing race of FIG. 22 with a torque tube (journal) segment entering the scissored-open bearing in the direction of the arrow, according to one or more embodiments.

FIG. 23 shows the bearing race of FIG. 22 with a torque tube 5 (journal) segment entering the scissored-open bearing in the direction of the arrow, according to one or more embodiments. As shown, once the first and second portions 10 are rotated apart, the torque tube 5 (journal) may be lowered into the formed opening of the bearing race.

Figure 24:
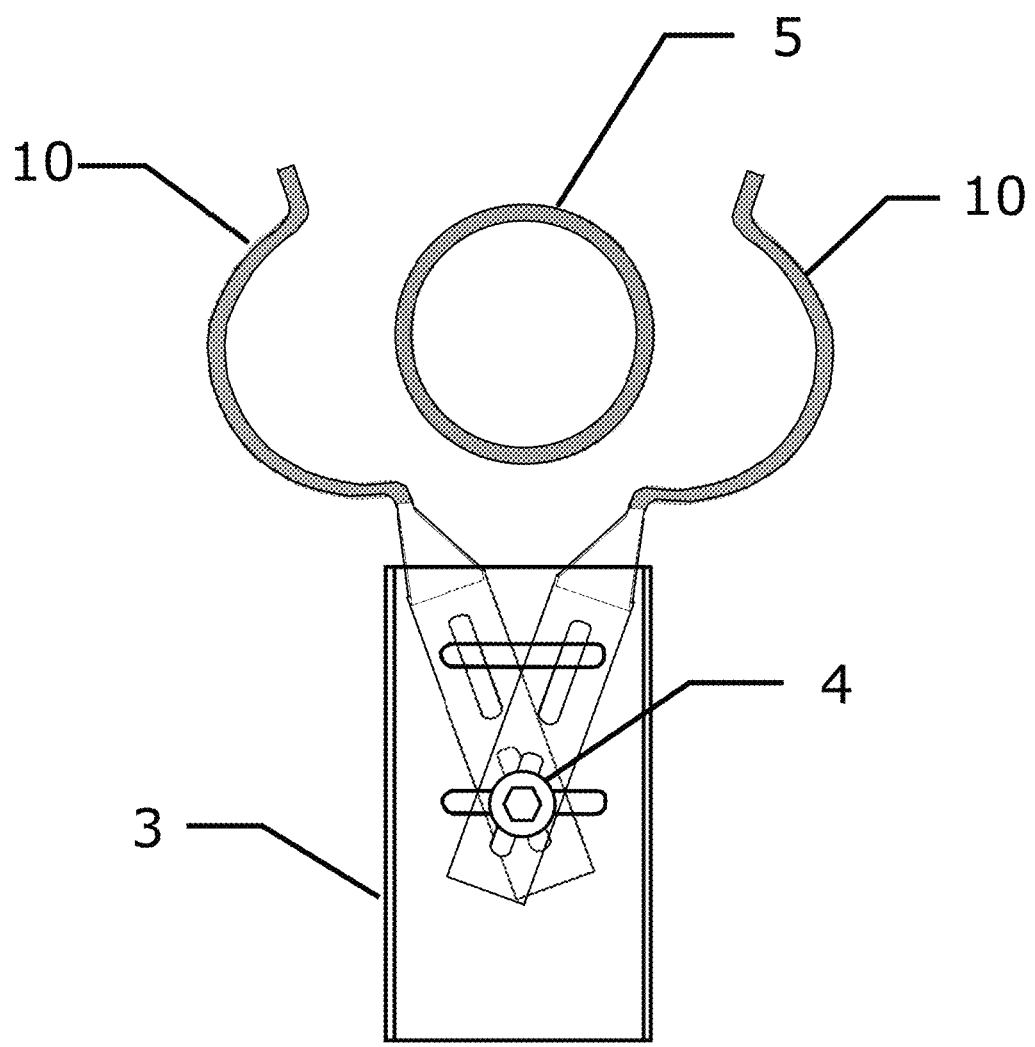
FIG. 24 shows the continuation from FIG. 23 with the torque tube (journal) segment suspended in the approximate center of an opened bearing race, according to one or more embodiments.

FIG. 24 shows the continuation from FIG. 23 with the torque tube 5 (journal) segment suspended in the approximate center of an opened bearing race, according to one or more embodiments. In one embodiment, the suspension (e.g., manually, via a crane or other machinery, robotically, etc.) of the torque tube 5 (journal) provides for ease of installing multiple torque tubes 5 (journals) in the field for assembling and disassembling solar tracking systems.

Figure 25:
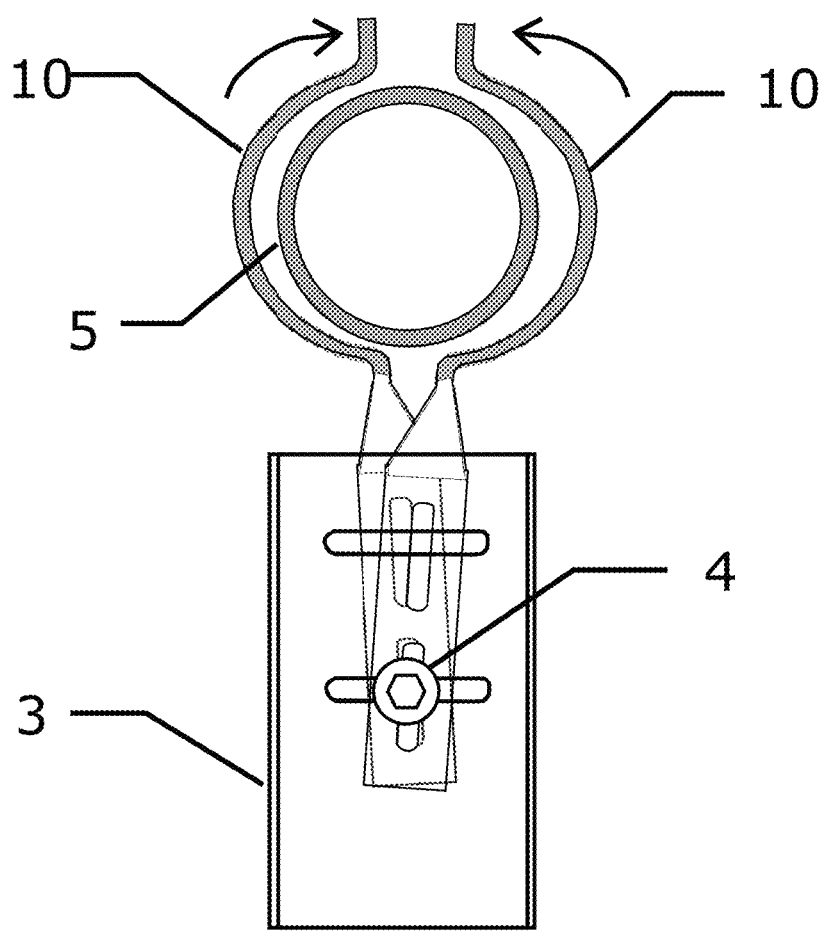
FIG. 25 shows the continuation from FIG. 24 with two bearing half-races pivoting-close to capture the torque tube (journal) segment, according to one or more embodiments.

FIG. 25 shows the continuation from FIG. 24 with two bearing half-races (first and second portions 10) pivoting-close in the direction of the arrows to capture the torque tube 5 (journal) segment, according to one or more embodiments. Once the bearing race is formed by rotating the first and second portions 10 towards each other, the tabs may be fastened together (e.g., via hardware 4, welding, etc.) and the post 3 (or pier) hardware 4 may be fastened such that the bearing race is completed with the torque tube 5 (journal).

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the various embodiments with various modifications as are suited to the particular use contemplated.

What is claimed is:

1. An apparatus of a single axis tracker comprising:
    a first strap component formed into a first portion of a bearing race, the first strap component having a first lower portion, a first middle portion and a first upper portion, the first middle portion is twisted about ninety degrees relative to the first lower portion to form a first transition neck; and
    a second strap component formed into a second portion of a bearing race, the second strap component having a second lower portion, a second middle portion and a second upper portion, the second middle portion is twisted about ninety degrees relative to the second lower portion to form a second transition neck;
    wherein the first twisted middle portion and the second twisted middle portion removably overlap one another such that the first upper portion and the second upper portion of the bearing race are aligned to hold a torque tube, the first lower portion and the second lower portion each comprises at least one fastening slot configured for attaching the bearing race to a support post, and the at least one fastening slot of the first lower portion and the at least one fastening slot of the second lower portion are configured for aligning with one another.

2. The apparatus of claim 1, wherein the first upper portion and the second upper portion removably overlap with one another to form a lower half of a bearing.

3. The apparatus of claim 2, further comprising:
an upper half of the bearing removably coupled to the lower half of the bearing, wherein the upper half of the bearing and the lower half of the bearing enclose a portion of the torque tube.

4. The apparatus of claim 3, wherein the torque tube rotates within the upper half and the lower half of the bearing.

5. The apparatus of claim 1, wherein the at least one fastening slot of each of the first lower portion and the second lower portion are vertically elongated fastening slots.

6. The apparatus of claim 5, wherein the first lower portion and the second lower portion are removably coupled to the support post via one or more fasteners inserted into one or more horizontal elongated fastening slots of the support post.

7. The apparatus of claim 1, wherein the first upper portion and the second upper portion removably interleave and form a whole bearing.

8. The apparatus of claim 5, wherein the torque tube rotates within the first upper portion and the second upper portion.

9. An apparatus for a single axis tracker comprising:
a metal first strap component formed into a first portion of a bearing race, the metal first strap component having a first lower portion, a first middle portion and a first upper portion, the first middle portion is twisted about ninety degrees relative to the first lower portion to form a first transition neck;
a second metal strap component formed into a second portion of the bearing race, the metal second strap component having a second lower portion, a second middle portion and a second upper portion, the second middle portion is twisted about ninety degrees relative to the second lower portion to form a second transition neck; and
the first lower portion and the second lower portion each comprises at least one fastening slot;
wherein the first twisted middle portion and the second twisted middle portion removably overlap one another such that the first upper portion and the second upper portion of the bearing race are aligned to hold a torque tube, the first lower portion and the second lower portion each comprises at least one fastening slot configured for attaching the bearing race to a support post, and the at least one fastening slot of the first lower portion and the at least one fastening slot of the second lower portion are configured for aligning with one another.

10. The apparatus of claim 9, wherein the first upper portion and the second upper portion removably overlap with one another to form a lower half of a bearing.

11. The apparatus of claim 10, further comprising:
an upper half of the bearing removably coupled to the lower half of the bearing, wherein the upper half of the bearing and the lower half of the bearing enclose a portion of the torque tube, and the torque tube rotates within the upper half and the lower half of the bearing;
wherein the at least one fastening slot of each of the first lower portion and the second lower portion are vertically elongated fastening slots.

12. The apparatus of claim 9, wherein the first lower portion and the second lower portion are removably coupled to the support post via one or more fasteners inserted into one or more horizontal elongated fastening slots of the support post.

13. The apparatus of claim 9, wherein the first upper portion and the second upper portion removably interleave and form a whole bearing and enclose a portion of the torque tube, and the torque tube rotates within the first portion of the bearing race and the second portion of the bearing race.

14. A system for solar panel tracking, the system comprising:
a metal first strap component formed into a first portion of a bearing race, the metal first strap component having a first lower portion, a first middle portion and a first upper portion, the first middle portion is twisted about ninety degrees relative to the first lower portion to form a first transition neck;
a second metal strap component formed into a second portion of the bearing race, the metal second strap component having a second lower portion, a second middle portion and a second upper portion, the second middle portion is twisted about ninety degrees relative to the second lower portion to form a second transition neck;
the first lower portion and the second lower portion each comprises at least one fastening slot;
a torque tube, wherein the first twisted middle portion and the second twisted middle portion removably overlap one another such that the first upper portion and the second upper portion of the bearing race are aligned to hold a torque tube; and
a support post coupled to the at least one fastening slot of each of the first lower portion and the second lower portion;
wherein the at least one fastening slot of the first lower portion and the at least one fastening slot of the second lower portion are configured for aligning with one another.

15. The apparatus of claim 14, wherein the first upper portion and the second upper portion removably overlap with one another to form a lower half of a bearing, and the at least one fastening slot of each of the first lower portion and the second lower portion are vertically elongated fastening slots.

16. The system of claim 15, further comprising:
an upper half of the bearing removably coupled to the lower half of the bearing, wherein the upper half of the bearing and the lower half of the bearing enclose a portion of the torque tube, and the torque tube rotates within the upper half and the lower half of the bearing.

17. The apparatus of claim 14, wherein the first lower portion and the second lower portion are removably coupled to the support post via one or more fasteners inserted into one or more horizontal elongated fastening slots of the support post.

18. The apparatus of claim 14, wherein the first upper portion and the second upper portion are removably interleave and form a whole bearing and enclose a portion of the torque tube, and the torque tube rotates within the first portion of the bearing race and the second portion of the bearing race.

19. The system of claim 14, further comprising:
at least one other torque tube coupled with the torque tube;
a solar tracker coupled to the torque tube; and
at least one solar panel coupled to the torque tube and the at least one other torque tube;
wherein the solar tracker tracks sunlight and rotates the torque tube and the at least one other torque tube.

\* \* \* \* \*